United States Patent
Loveland et al.

(10) Patent No.: US 9,367,706 B2
(45) Date of Patent: Jun. 14, 2016

(54) COMPUTATION TO GAIN ACCESS TO SERVICE

(75) Inventors: Shawn D. Loveland, Sammamish, WA (US); Geoffrey J. Hulten, Lynnwood, WA (US); John L. Scarrow, Sammamish, WA (US)

(73) Assignee: Microsoft Technology Licensing, LLC, Redmon, WA (US)

( * ) Notice: Subject to any disclaimer, the term of this patent is extended or adjusted under 35 U.S.C. 154(b) by 1192 days.

(21) Appl. No.: 12/753,841

(22) Filed: Apr. 2, 2010

(65) Prior Publication Data

US 2011/0247061 A1 Oct. 6, 2011

(51) Int. Cl.
*G06F 21/62* (2013.01)
*H04L 29/06* (2006.01)
*G06Q 30/02* (2012.01)
*G06Q 10/10* (2012.01)
*H04L 12/58* (2006.01)

(52) U.S. Cl.
CPC .............. *G06F 21/629* (2013.01); *G06Q 10/10* (2013.01); *G06Q 30/02* (2013.01); *G06Q 30/0208* (2013.01); *G06Q 30/0235* (2013.01); *H04L 12/585* (2013.01); *H04L 51/12* (2013.01); *H04L 63/108* (2013.01); *H04L 12/588* (2013.01)

(58) Field of Classification Search
CPC ..... H04L 12/585; H04L 12/588; H04L 51/12; H04L 63/10; H04L 63/108; H04L 63/0227; G06Q 10/10; G06Q 30/02; G06Q 30/0207; G06Q 30/0208; G06Q 30/0235; G06F 21/62; G06F 21/629; G06F 2221/2117; G06F 2221/2149

USPC .................................................. 726/6
See application file for complete search history.

(56) References Cited

U.S. PATENT DOCUMENTS

| | | | |
|---|---|---|---|
| 7,552,176 B2 | 6/2009 | Atkinson et al. | |
| 8,001,582 B2* | 8/2011 | Hulten et al. | 726/3 |
| 8,359,632 B2* | 1/2013 | Guo et al. | 726/3 |
| 2004/0199633 A1* | 10/2004 | Pearson | 709/226 |

(Continued)

OTHER PUBLICATIONS

"The Coordinated Spam Reduction Initiative: A Technology and Policy Proposal", Retrieved at << http://julian.io.link-m.de/ms-caller-id/csri.pdf >>, Microsoft Corporation, Feb. 13, 2004, pp. 1-54.

(Continued)

*Primary Examiner* — Zachary A Davis
*Assistant Examiner* — Devin Almeida
(74) *Attorney, Agent, or Firm* — Bryan Webster; Judy Yee; Micky Minhas

(57) ABSTRACT

Access to some aspect of a service may be limited until a user has invested in performing some amount of computation. Legitimate users typically have excess cycles on their machines, which can be used to perform computation at little or no cost to the user. By contrast, computation is expensive for for-profit internet abusers (e.g., spammers). These abusers typically use all of their computing resources to run "bots" that carry out their schemes, so computation increases the abuser's cost by forcing him or her to acquire new computing resources or to rent computer time. Thus, the providers of free services (e.g., web mail services, blogging sites, etc.), can allow newly registered users to use some limited form of the service upon registration. However, in order to make more extensive use of the service, the user can be asked to prove his legitimacy by investing in some amount of computation.

20 Claims, 7 Drawing Sheets

(56) References Cited

U.S. PATENT DOCUMENTS

| | | | |
|---|---|---|---|
| 2006/0031338 | A1 | 2/2006 | Kang et al. |
| 2006/0095578 | A1 | 5/2006 | Paya et al. |
| 2009/0187988 | A1 | 7/2009 | Hulten et al. |
| 2009/0300720 | A1 | 12/2009 | Guo et al. |
| 2010/0332262 | A1* | 12/2010 | Horvitz et al. ................. 705/4 |

OTHER PUBLICATIONS

Dinh, et al., "A Sybil-resilient reputation metric for P2P applications", Retrieved at << http://ieeexplore.ieee.org/stamp/stamp.jsp?tp=&arnumber=4604569&isnumber=4604514 >>, SAINT, Proceedings of the 2008 International Symposium on Applications and the Internet, Jul. 28-Aug. 1, 2008, pp. 193-196.

Gutowska, et al., "Computing Reputation Metric in Multi-agent E-commerce Reputation System", Retrieved at << http://ieeexplore.ieee.org/stamp/stamp.jsp?arnumber=04577792 >>, ICDCSW, Proceedings of the 2008 The 28th International Conference on Distributed Computing Systems Workshops, Jun. 17-20, 2008, pp. 255-260.

Merkle, Ralph, "Project Proposal—Establishing secure communications between separate secure sites over insecure communication lines", Fall 1974, retrieved from << http://merkle.com/1974/CS244ProjectProposal.pdf >>, pp. 1-7.

Merkle, Ralph C., "Secure Communications Over Insecure Channels," Communications of the ACM, Apr. 1978, pp. 294-299, vol. 21, No. 4.

Back, Adam, "Hashcash—A Denial of Service Counter-Measure", retrieved from << http://www.hashcash.org/hashcash.pdf >>, dated Aug. 1, 2002, pp. 1-10.

"Penny Black", retrieved from << http://research.microsoft.com/en-us/projects/pennyblack/ >>, retrieved on Jan. 20, 2010, 3 pages.

Dwork, et al., "On Memory-Bound Functions for Fighting Spam", in Proceedings of the 23rd Annual International Cryptology Conference (CRYPTO 2003), Aug. 2003, pp. 426-444, Springer-Verlag.

* cited by examiner

COMPUTATION TO GAIN ACCESS TO SERVICE

BACKGROUND

Internet abusers often use free e-mail services and blogging sites to launch their attacks. For example, spammers typically register for free e-mail accounts and use these e-mail accounts to send spam. Moreover, the spam e-mails typically encourage users to follow links contained in the e-mails, and these links often point to web sites where users can host content for free, such as blogging sites or photo-sharing sites. In some cases, the content hosted on these sites contains viruses, phishing, or other malicious content that the abusers want to propagate. In other cases, visiting the site simply serves to confirm that the spam e-mail reached a real user, or to collect conversions when users buy the products advertised in the spam.

Using a service as a launch point for attacks tends to devalue the service, since the public may come to associate the abuse with both the service and the service's domain name. Hosting the abusive activity is expensive for the service provider, and is also detrimental to both the provider and to the provider's legitimate users. Thus, responsible service providers often seek to ban abusive activity from their services.

However, banning abusive activity from a service is difficult. Distinguishing legitimate users from non-legitimate users is a hard problem. The fact that a new e-mail account is associated with a spammer may not become apparent until the spammer has used the account to send many e-mails (e.g., fifty). The service provider can shut down the account quickly after the abuse is detected, but by that time the damage already has been done. The spammer then can register for another e-mail account and can send another fifty e-mail messages from the new account.

Service providers can ask a user to prove his or her legitimacy before giving the user access to services. Various techniques exist to allow users to prove their legitimacy. For example, a web mail service might ask a user to respond to a text message, or to call a phone number. The goal of these techniques is to increase the cost of obtaining access to a service beyond the level that would be acceptable to a typical abuser. However, many of these techniques fail to achieve their goal. Some techniques are too expensive for the service provider to implement. Some impose too little cost on abusers to deter abusive activity. Some impose too great a cost on legitimate users, which discourages legitimate users from using the service and threatens the traffic/advertising-based revenue model of such services.

SUMMARY

Gaining access to certain services, or to aspects of services, may depend on a user's having performed a certain amount of computation. The use of computation as a pre-condition to accessing a service imposes a cost to accessing the service. However, the cost is imposed in a way that is likely to be expensive for abusers but unobtrusive to legitimate users. Legitimate users typically have excess idle CPU cycles which can be devoted to computation at no out-of-pocket cost. For-profit abusers, however, generally use services on a massive scale, and thus seek to automate their interaction with the services. For these abusers, performing the requested computations is likely to involve a cost of computing services that cannot come from resources that would otherwise be idle. Thus, for the abusers, the computations may make the cost of using the service uneconomical to do at scale.

When a user registers for a service (e.g., gets a new e-mail account, creates a new blog, creates a photo gallery, etc.), the user may be given access to some limited form of the service without pre-condition. However, the user may be asked to perform some type of computation as a pre-condition to accessing another aspect of the service. For example, with an e-mail account, a user initially might be allowed to send a small number of e-mails per day, but might have to perform some amount of computation to earn the right to send more than fifty e-mails per day. Or, with a blog, a new user initially might be allowed to post text messages, but might have to perform some amount of computation to earn the right to post images or other files.

The computation may be performed by software that runs on the user's machine. For example, when registering for a service, the service might request permission to install an application on the user's machine that performs the computation. Or, use of the service might involve installing a specific client application on the user's machine, and that client might include a component that performs the computation. Or, the computation might be performed by scripts (e.g., Java scripts, Silverlight scripts, etc.) that run in a user's browser during the time that the user is interacting with the service. Whatever component performs the computation might be configured to avoid using more than some percentage of processor time in order to make the computation unobtrusive. Or, the component might allow a user to set parameters such as the percentage of processor time can be devoted to computation, and/or the specific times of day at which the computation may be performed.

Regardless of what type of component is used to perform the computation, that component may be given a problem to solve. Access to some aspect of a service may be granted upon proof that the problem has been solved. In some cases, earning the right to access an aspect of a service may involve solving the problem more than once, possibly on several different days. The nature of the problem may be such that work on the problem can be checkpointed, so that a user's progress toward solving the problem can be stopped on one machine and then resumed from that checkpoint on another machine. Once the problem has been solved, proof that the problem has been solved is presented to the operator of the service. Upon receiving such proof, the operator of the service may grant access to some aspect of the service that otherwise has been withheld from the user.

Devoting the computational resources to solving a problem is effectively free for a legitimate user (who can solve the problem with excess resources that would otherwise be idle) but expensive for a for-profit abuser (for whom the use of resources has a real cost). Thus, the ability and willingness to perform the computation to solve the problem is a strong indication that the user is a legitimate user rather than a for-profit abuser. In this sense, any problem of sufficient computational complexity will serve to differentiate legitimate users from abusers. However, in one example, the problem to be solved can be a real-world problem, in which case solving the problem not only deters Internet abuse but also increases the world's body of knowledge.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
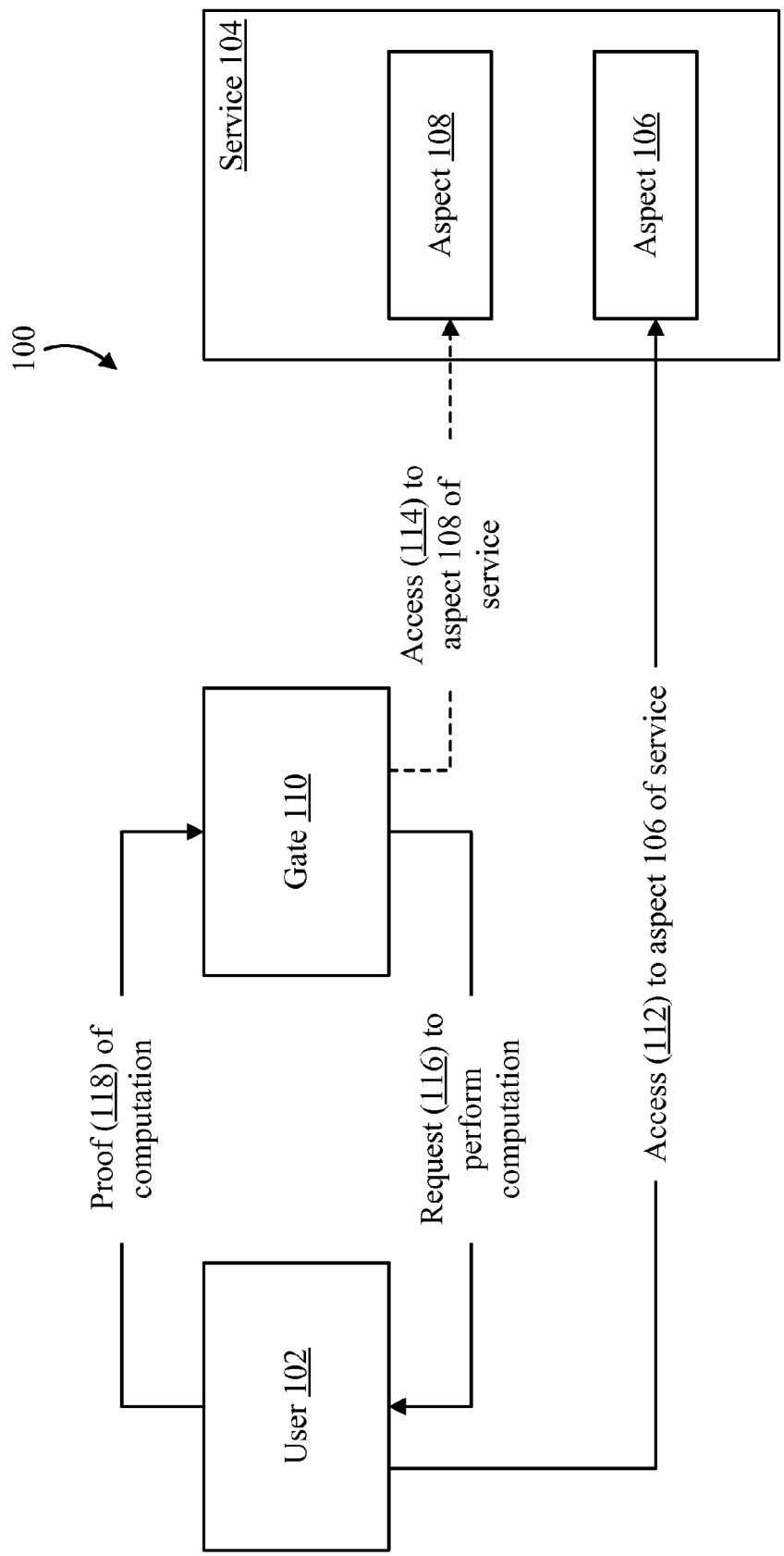
FIG. 1 is a block diagram of an example system in which access to an aspect of a service may be controlled.

Many common computing services are offered to users at no cost, and are paid for through a traffic-generation/advertising revenue model. For example, there are many services that offer e-mail accounts, file-sharing, photo-sharing, document editing, and blogging, but do not charge the users for these services. While this model of providing services has been a boon to consumers and service providers alike, it also has the disadvantage that it enables abusive users—such as spammers—to gain free access to Internet services.

Abusers, such as the senders of mass spam e-mails or the distributors of malware, rely on these free services. Spammers frequently sign up for large numbers of e-mail accounts from which to send spam e-mails. The e-mails often point to files that are hosted on blogging sites. Since the e-mail and blogging accounts can be obtained at little cost to the registrant, there is effectively no barrier to abusers obtaining as many of these accounts as they want. However, allowing abusers to use a service exacts a cost, both for the service provider and for legitimate users of the service. Providing services to the abuser costs the service provider money, and the cost of providing the service to for-profit abusers can rarely be recouped through the provider's advertising model. Moreover, the use of a service to host abuse devalues that service for legitimate users. For example, if a web mail service becomes known as a place from which spammers often send mail, then all mail from that service's domain may come to be regarded with suspicion—even the mail of legitimate users. Thus, service providers typically police the use of their services, and shut down accounts when abuse is detected. However, detection of an abuser usually occurs after the fact—e.g., after a spammer has already sent, say, fifty or more spam e-mails. By the time the abuser's account is canceled, the damage has already been done, and the spammer likely has already obtained another e-mail account.

One reason that spammers and other abusers are able to use free services for abuse is that the cost of obtaining these services is small. Users may have to undergo a Human Interaction Proof (HIP) (e.g., a challenge of the form "type the letters you see here"). But software exists that can pass these challenges, and—even if a person has to make the effort to pass the challenge—the cost of passing the challenge is still relatively low. Many web mail services allow users to sign up for an e-mail account simply by filling out a form. Large-scale abusers often use "bots" to automate the process of obtaining these accounts, so the cost of obtaining an account is generally the negligible cost of a small amount of computer and/or human time. Thus, for little cost, abusers can get access to a nearly unlimited amount of the services that they use.

The subject matter herein may be used to increase the cost of obtaining services, thereby deterring the use of such services by abusers. The costs may be imposed in a way that is significant to abusers while being trivial to legitimate users. Services, such as e-mail or blog hosting, may be deployed to new users in phases. At the time that a user signs up for the service, the user may be given access to some aspect of the service. For example, a new user of a web mail service might be allowed to receive mail, and might be allowed to send fifty e-mails per day. However, the ability to make larger-scale use of the service—e.g., sending thousands of e-mails per day—might be withheld until the user performs some amount of computation.

Since performing the computation uses computing resources, having to perform the computation serves to impose a cost on users who want access to certain aspects of a service. However, the way in which the computation is performed may impose a trivial cost on a legitimate user, while imposing a significant cost on an abuser. For example, on a legitimate user's machine, the computation may be performed during times that the processor would otherwise be idle. By contrast, abusers typically have fewer spare cycles than legitimate users who make personal use of a service. Rather, abusers pay for the resources they use either in the form of buying and maintaining some number of machines, or by renting time on other machines. Thus, having to perform the computation costs money to professional abusers, while it costs effectively no money to legitimate users. Additionally, abusers tend to use services far more extensively than legitimate users (e.g., sending many more e-mails than legitimate users). Therefore, computation conditions can be imposed on a continual basis, which imposes a continuing cost on abusers. The amount and frequency with which computation can be performed can be chosen to make the amount of computational resources that it would cost to continue to make extensive use of a service (e.g., to send a large number of e-mails every day) unacceptable to a for-profit abuser.

Moreover, when a service provider uses computation as a precondition to granting access to some aspect of a service, the provider can impose various additional conditions on the computation that further increase the cost to professional abusers. For example, the provider can call for users to perform several different computations on successive days. Since abusers often rent time on machines by the day, having to perform computations on successive days imposes a significant cost on abusers, since they would have to rent several days worth of time to perform the computation. Even if this type of computation does not impose a direct monetary cost on a particular abuser, it may, in effect, decrease the scalability of getting new accounts at the volume that would allow abusers to turn a profit. Moreover, the component that performs the computation can be embedded in web pages, and can be configured to work only when users are interacting with the web pages. Since legitimate users actually do interact with the web pages of the services that they use, such a constraint imposes little or no cost on the legitimate user. (Additionally, having the computation performed when the user is interacting with the web page may underscore the value proposition to the user, since the cycles on the user's machine would be consumed when the user is interacting with the service.) However, in order to allow computation to proceed, an abuser would either have to devote the human labor to interact with the web page, or would have to configure a bot to interact with the web page—both of which cost the abuser time and/or money. In effect, the process of obtaining services can be made expensive to abusers, while costing legitimate users little or nothing. In this sense, the expense that is imposed by computation tends to repel the type of users that service providers want to avoid, without repelling the kinds of user that service providers want.

Any aspect of a service may be withheld pending computation. For example, a user who registers for a new web mail account or blogging account might be entirely barred from using the service, until some amount of computation is performed. However, in another example, the user might be allowed some limited use of the service immediately upon registration for the service, while broader use of the service might be withheld pending performance of the computation. For example, as noted above, the user of a new web mail account might be allowed to receive mail and to send fifty e-mails per day, but might have to perform a computation in order to send more than fifty e-mails per day. Deploying access to a service in this manner helps to ensure that legitimate users are not inconvenienced by the computation condition. A large proportion of legitimate users do not send more than, e.g., fifty e-mails per day, so imposing this limitation on use of a new web mail account would not affect these users' usage at all.

Moreover, even for users who want to use their accounts in ways that are conditioned on the performance of computation, the computation can be done in a way that imposes minimal impact on the user's machine and that respects the user's right to choose how his or her machine is used. For example, the user can be asked to give permission to install the component that performs the computation, and might even be given options other than computation as a way to demonstrate his or her legitimacy. The user may be allowed to configure the component in order to choose what percentage of the processor can be used for computation, or what times of day the computation can be performed. The component might be designed in a way that allows the computation to be started on one machine and moved to another, thereby allowing the same user to switch seamlessly between several different machines without setting back his or her progress on the computation.

Any type of computation would serve the goal of imposing a cost on abusers. For example, the component that performs the computation could receive some type of problem to solve (e.g., providing a string to the client, and asking the client to find an encryption key such that the encrypted string begins with N zeros), and could then provide evidence that the machine on which that component is running has actually performed the calculations to solve this problem. However, in one example, the computation might be in furtherance of solving a real world problem. For example, the "problem" might be performing calculations involved in designing a new vaccine, or analyzing data to detect patterns of ongoing criminal activity. In this sense, computation might serve the dual purposes of deterring Internet abuse and solving real-world problems. (Real-world likely do not have a known solution against which one user's solution can be checked. However, the same problem could be given to several users, and an unknown user's solution could be checked against the solution(s) of users who are known to be legitimate, as a way of deterring cheating on these solutions.) Additionally, since the use of users computers in this way would, effectively, make the user's machines a large supercomputer, safeguards could be put in place to ensure that this supercomputer is not being used to solve a malicious task.

Turning now to the drawings, FIG. 1 shows an example system 100 in which access to an aspect of a service may be controlled. In system 100, user 102 is a person, entity, bot, etc., that wants to gain access to service 104. Service 104 could be any type of service. For example, service 104 might be a web mail service, a blogging service, a file hosting service, a photo sharing service, a document editing service.

Service 104 may have various aspects. In the example of FIG. 1 service 104 is shown as having two aspects 106 and 108, although a service could have any number of aspects. Aspects 106 and 108 may be distinct in the sense that they are different functions performed by service 104, or in the sense that they are different quantities of the same function. For example, if service 104 is a web mail service, then aspect 106 might be sending fifty e-mails per day, and aspect 108 might be sending more than fifty e-mails per day. If service 104 is a blogging service, then aspect 106 might be the ability to post text on a blog, and aspect 108 might be the ability to host other types of information (e.g., images, files, etc.), on the blog.

Access to some or all of service 104 may be controlled by gate 110, which determines which, if any, aspects of service 104 user 102 may use. Gate 110 may be implemented in any manner. In one example, gate 110 comprises software that executes on the server(s) that implement(s) service 104. In that case, the software may simply decide whether or not to perform some action on behalf of user 102 based on whether user 102 has the right to perform that action. In one example, gate does not block access to aspect 106 at all, but conditions access to aspect 108 upon proof that user 102 has performed sufficient computation to earn access to aspect 108. Thus, if user 102 requests access 112 to aspect 106 of service 104, user 102 may gain such access without being impeded by gate 110. In another example, gate 110 blocks access to all aspects of service 104 until sufficient computation has been performed. However, there may be reason to allow user 102 to use some aspect(s) of service 104 prior to performing any computation. For example, one might want to allow user 102 to send a small number of e-mails per day without any pre-conditions, while withholding the right to send a larger number of e-mails per day until user 102 earns that right. (In one example variation, the amount that a user is allowed to do might increase as the user makes more progress on solving a problem—e.g., if a problem takes seven days to solve, the user might be allowed to send 50 e-mails before working on the problem at all, then 60 e-mails on the first day, 70 e-mails on the second day, and so on until the user has completed the problem.)

When user 102 requests access 114 to aspect 108 of service 104, gate 110 determines whether to grant such access to user 102. For example, if service 104 is a web mail service that imposes a fifty e-mail per day limit until user 102 has performed sufficient computation, then the request to access aspect 108 may occur when user 102 attempts to send his or her fifty-first e-mail on a single day. Gate 110 may allow user 102 access this aspect of service 104 if user 102 has performed sufficient computation. Otherwise, gate 110 may deny access to aspect 108.

At some point in time, gate 110 may issue a request 116 for user 102 to perform some computation, which will allow user 102 to gain access to aspect 108. Gate 110 might make this request in response to user 102's attempt to access aspect 108, but could also make this request proactively before user 102 attempts to access aspect 108. Thus, in one example, gate 110 installs (or asks user 102 to install) a component that performs computation. This installation may take place, for example, at or around the time that user 102 signs up to use service 104—e.g., at the time that user 102 requests a new e-mail account with service 104. Or, gate 110 might wait until user 102 attempts to access aspect 108, at which time gate 110 might notify user 102 that the request to access aspect 108 is denied, but that user 102 can install or enable the computation component in order to gain access to aspect 108 at a later time. Once the component that performs the computation has been installed and/or enabled, and once it has performed sufficient computation, proof 118 of that computation may be created and may be provided to gate 110. After such proof has been provided, gate 110 may allow user 102 access to aspect 108. The component that performs the computation, and the nature of the proof 118 that could be provided, are further described below.

Figure 2:
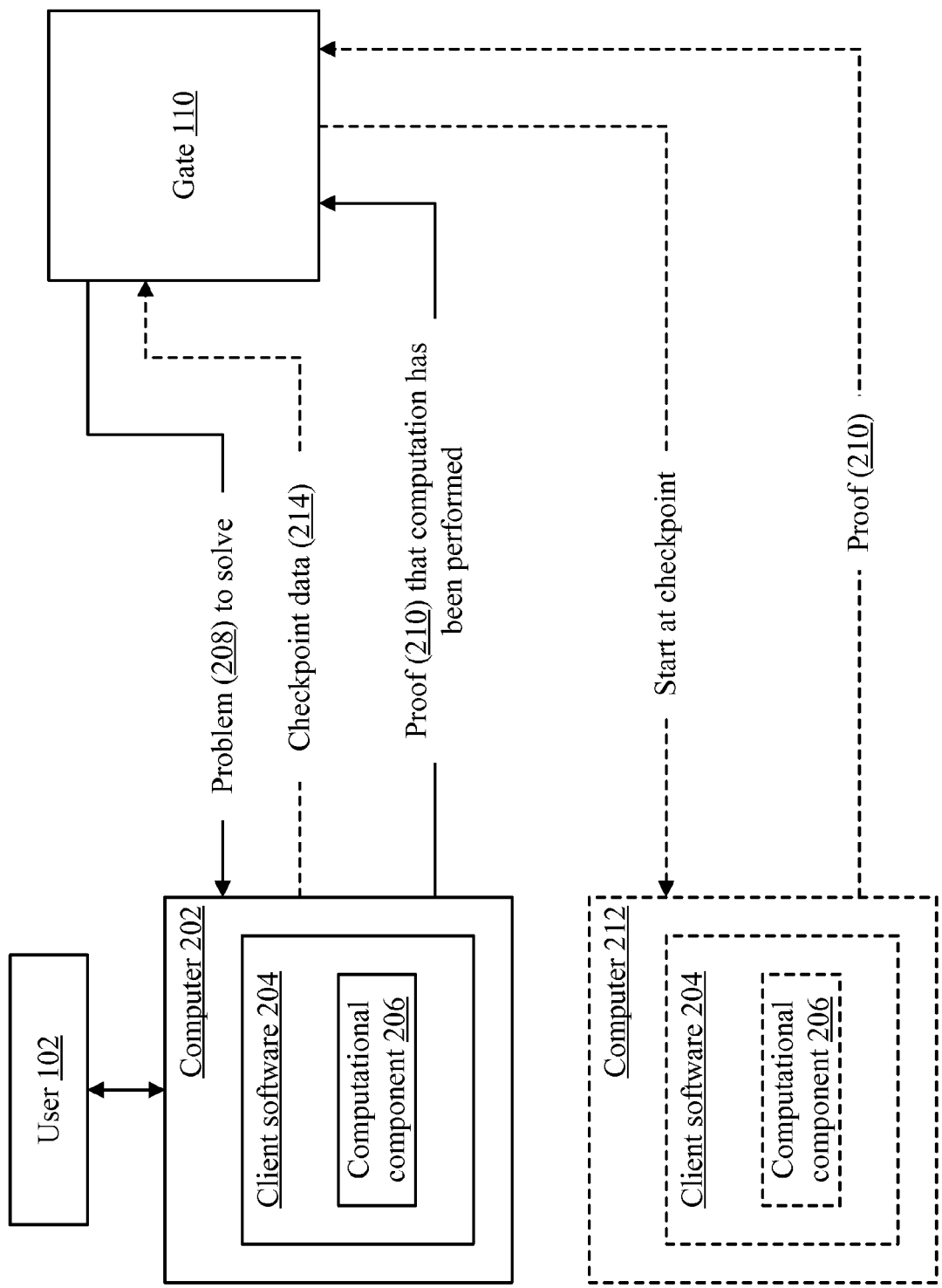
FIG. 2 is a block diagram of an example environment in which a user may perform computation to gain access to an aspect of a service.

FIG. 2 shows an example environment in which a user may perform computation in order to gain access to an aspect of a service. User 102 uses computer 202 to interact with a service (such as service 104, shown in FIG. 1). In one example, the service with which user 102 interacts is a web service, and user 102 may interact with this service using a web browser on computer 202. However, the service with which user 102 interacts could be any kind of service.

Client software 204 may be installed on computer 202. Client software 204 may comprise computational component 206. In one example, client software is an application that helps user 102 to use a service—e.g., a mail client application that helps a user to use a mail service. In that example, computational component 206 is merely one component of client software 204. However, in another example, client software 204 is entirely devoted to performing the computations that would allow user 102 to earn the right to access an aspect of a service. In that example, client software 204 might contain only computational component 206. Client software 204 might be provided to computer 202 at the time that user 102 registers to use a service, or client software 204 might be provided to computer 202 at some other time.

At some point, user 102 is asked to perform a computation. This request that user 102 perform a computation may happen explicitly—e.g., a message may be displayed to inform user 102 that he or she will have to have his or her computer perform some computation in order to gain access to some aspect of a service. Or, as another example, the request to perform a computation may be made transparently without any direct interaction with user 102—e.g., the server that provides the service in question might make the request directly to client software 204 (but in a way that respects user 102's interest in controlling how his or her computer is used). It is noted that the request to perform computation may come from gate 110 as shown. However, inasmuch as the request to perform computation is to allow user 102 to obtain access to some aspect of a service that is not otherwise available, the request to perform computation may come from any component associated with that service.

At some point in time, gate 110 (or some other component) may send computer 202 a problem 208 to solve. Problem 208 could be any type of problem—e.g., a mathematical problem, such as calculating the first N numbers in a series, or breaking a code by brute force. Any type of problem could be chosen. As noted above, one purpose of the computation is to increase the cost of gaining access to some aspect of a service, as a way of deterring abusers from using the service. Thus, the problem may be chosen in such a way that solving it involves significant computational resources.

Computational component 206 may cause computer 202 to perform computations in furtherance of solving problem 208. At some point, computational component 206 causes computer 202 to send, to gate 110, proof 210 that the computations have been performed. Typically, proof 210 constitutes a solution to problem 208. However, it is noted that problem 208 might not have a solution. One purpose of having computer 202 solve a problem is to cause user 102 to invest computational resources as a show of good faith prior to gaining access to a service. Thus, it does not matter whether problem 208 actually has a solution, as long as it can be demonstrated that computer 202 expended computational resources on problem 208. Thus, proof 210 might include a solution to problem 208, but might take some other form.

In one example, all of the computation toward solving problem 208 is performed on computer 202. However, user 102 might use several different computers (e.g., the user might own several computers, or might use public computers), and the computation might follow that user. Thus, if user 102 shifts from computer 202 to computer 212 at some point while the computation is being performed, computer 202 might send checkpoint data 214 to gate 110, where checkpoint data 214 indicates how far computer 202 reached in the computation. Computer 212 may have a copy of client software 204 and/or computational component 206, which can continue the computation. Thus, if user 102 shifts from computer 202 to computer 212, then gate 110 can instruct computer 212 to start at the checkpoint at which computer 202 stopped. The checkpoint data 214 may provide a very fine-grained indication of how much progress has already been made in the computation, which may allow the computation to be continued on another computer without repetitive work. Computer 212 can then continue the computation, and—when finished—can provide proof 210 that the computation has been performed.

Figure 3:
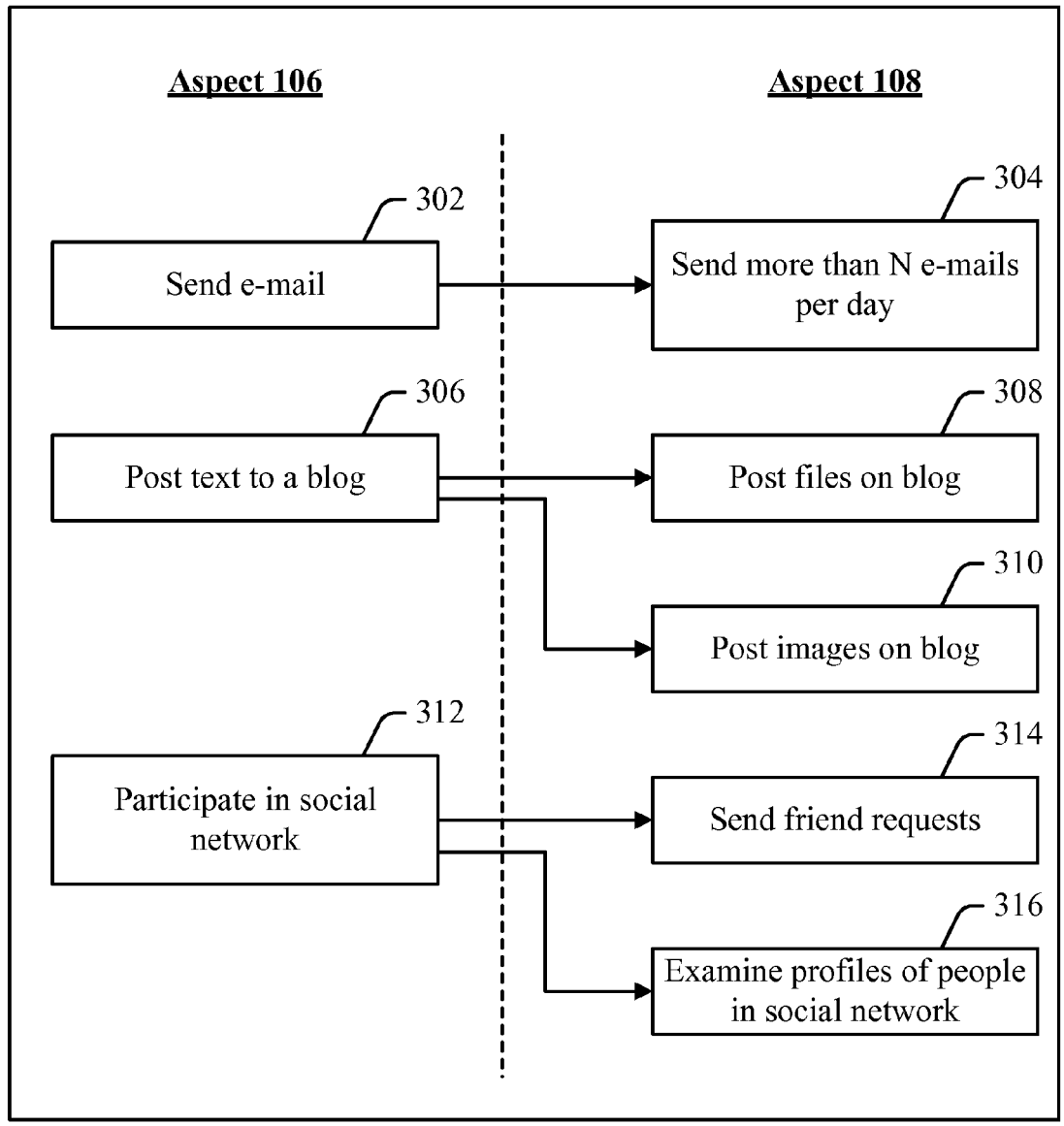
FIG. 3 is a block diagram of various example aspects of a service.

When gate 110 receives proof 210, gate 110 can begin to allow user 102 access to some aspect of a service. FIG. 3 shows various aspects of a service, and how the user's ability to use the service might change after computation has been performed.

In FIG. 3, aspect 106 is an aspect of a service to which a user may have access at the time that he or she registers for the service. Aspect 108 is an aspect of a service to which the user might not be granted access until the user has made some investment in performing computation, as a show of the user's legitimacy. (Aspects 106 and 108 are first introduced in FIG. 1. In that figure, it is shown that user 102 can access aspect 106 upon registration without being blocked by gate 110, but gate 110 blocks access to aspect 108 until user 102 has performed sufficient computation.)

In one example, the service in question is an e-mail service. Thus, aspect 106 might be the ability to send e-mail (block 302), and aspect 108 might be the ability to send more than N e-mails per day, where N is some number (block 304). Thus, in one example, a user can send some amount of e-mail upon registration, but can send a larger amount of e-mail after the user has invested resources in performing some amount of computation.

In another example, the service in question is a blogging service. Thus, aspect 106 might be the ability to post text to a blog (block 306), and aspect 108 might be the ability to post files to the blog (block 308), or to post images to the blog (block 310). In this example, a user could post text upon registration with the blogging service, but could post other types of content after the user has invested in performing computation.

In another example, the service in question is a social networking site. Thus, aspect 106 might be the ability to participate in a social network (block 312), and aspect 108 might be the ability to send friend requests (block 314) or to read profiles of members of the social network (block 316). Thus, a user might be granted some basic participation in the social network upon registration, but might be allowed to interact with people in richer ways after investing in sufficient computation to demonstrate the user's legitimacy.

Figure 4:
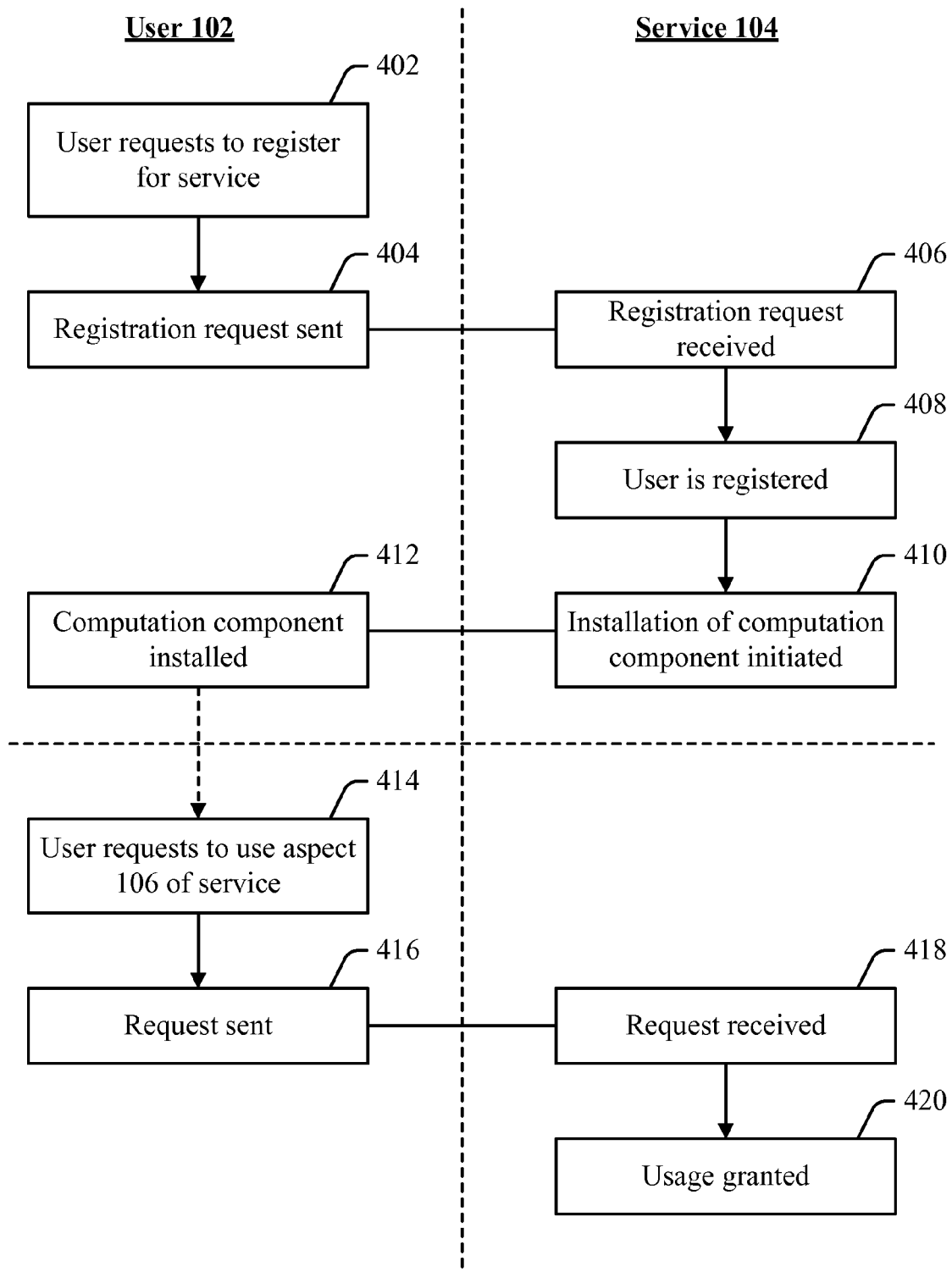
FIG. 4 is a flow diagram of an example process in which a user registers to use a service, and in which access to some aspect of the service may be granted.
Figure 5:
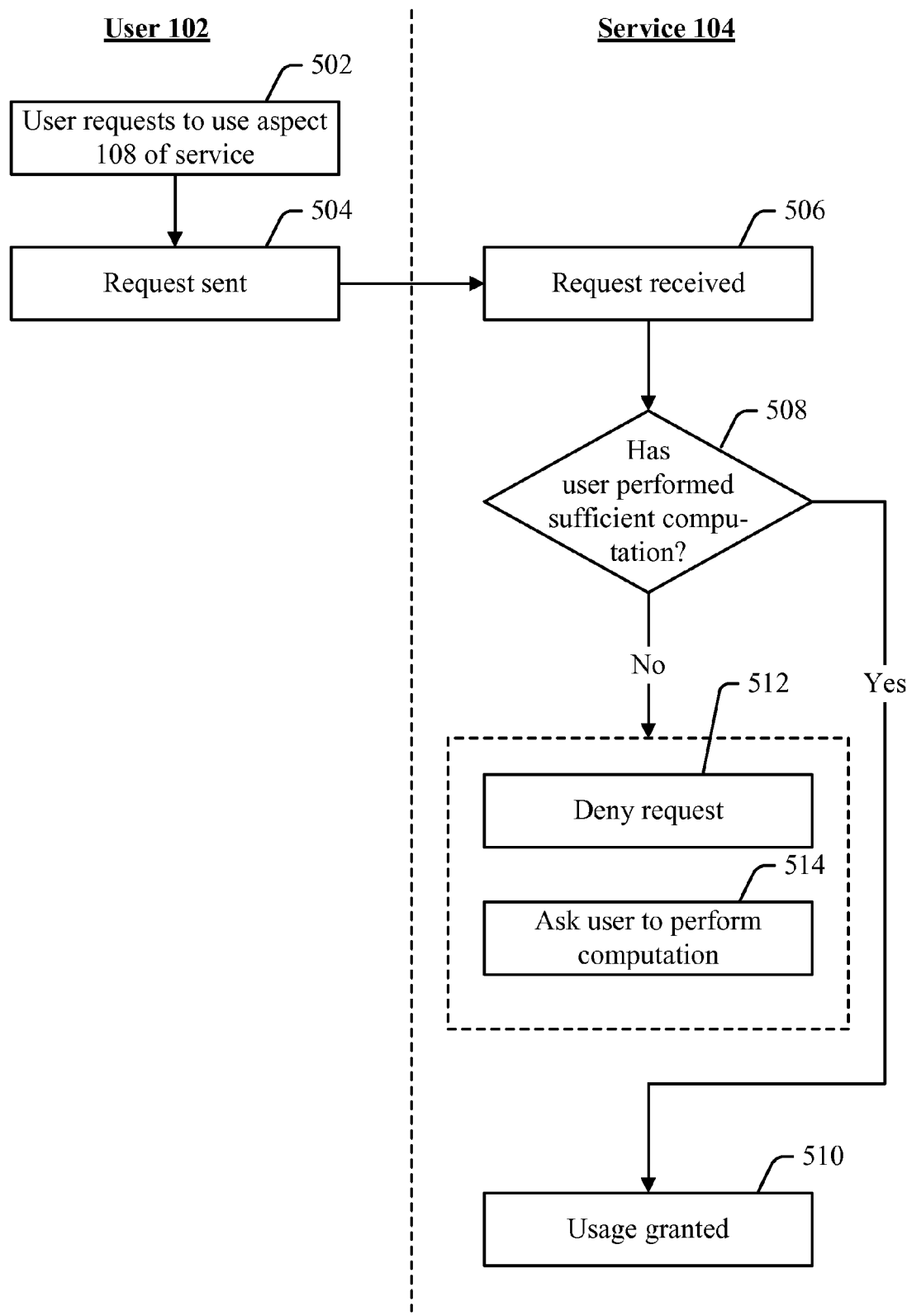
FIG. 5 is a flow diagram of an example process in which a user may request to use an aspect of a service.

FIG. 4 shows, in the form of a flowchart, an example process in which a user registers to use a service, and in which access to some aspect of the service may be granted. Before turning to a description of FIG. 4, it is noted that the flow diagrams contained herein (both in FIG. 4 and in FIG. 5) are described, by way of example, with reference to components shown in FIGS. 1-3, although these processes may be carried out in any system and are not limited to the scenarios shown in FIGS. 1-3. Additionally, each of the flow diagrams in FIGS. 4 and 5 shows an example in which stages of a process are carried out in a particular order, as indicated by the lines connecting the blocks, but the various stages shown in these diagrams can be performed in any order, or in any combination or sub-combination.

In the example of FIG. 4, user 102 is registering to use service 104 (both of which are first shown in FIG. 1), and the actions that may be performed by user 102 and service 104 are shown in their respective columns of the flowchart.

At 402, a user request to register for a service. For example, service 104 might be a web mail service, and user 102 may fill out a web form to register for a new e-mail account. At 404, the registration request is sent by the user to the service. After the registration request is received by the service (at 406), the user is registered to use the service (at 408). After the user is registered, installation is initiated (at 410) of the component that will perform computation on the user's machine, and this component is then installed (at 412). (Or, the component may already have been installed as part of a prior process.)

At some subsequent point in time, the user requests (at 414) to use aspect 106 of the service (where aspect 106 is shown in FIG. 1). (The horizontal dotted line indicates the optional passage of time between 412 and 414.) Continuing with the example in which the service is a web mail service, aspect 106 might be the ability to send e-mail, up to some daily numerical limit. In this example, the normal procedure that the user carries out to compose and send an e-mail would constitute a request to use that aspect of the service. The request is then sent (at 416), and subsequently received by the service (at 418). As discussed above in connection with FIG. 1, aspect 106 might be usable without the precondition of the user's performing some amount of computation. Thus, usage of this aspect of the service is granted (at 420).

FIG. 5 shows an example process in which a user may request to use an aspect of a service, where use of the aspect is condition upon the user's having performed sufficient computation. As in FIG. 4, the columns in FIG. 5 indicate actions that may be performed by user 102 or service 104, respectively.

At 502, user 102 may request to use aspect 108 of service 104. As described above in connection with FIG. 1, access to aspect 108 may be controlled by a gate, which either allows or disallows use of aspect 108 depending on whether user 102 has earned the right to use that aspect by having performed a sufficient amount of computation. The request to use aspect 108 could take any form. Continuing with the prior example in which service 104 is a web mail service, aspect 108 might be the sending of more than some pre-determined number of e-mails per day. Thus, the request to use aspect 108 might take the form of attempting to send an e-mail when the pre-determined number already has been exceeded for the current day. The request is then sent (at 504), whereupon it is received by service 104 (at 506).

At 508, it is determined whether the user has performed sufficient computation to use the requested aspect of the service. This determination may be made by gate 110 (shown in FIG. 1), but could be made by any appropriate component. If the user has performed sufficient computation, then usage of the requested aspect of the service is granted (at 510). If the user has not performed sufficient computation, then one or more of the actions shown at 512 and 514 may be performed.

For example, the request to use aspect 108 of the service may be denied (at 512) and/or the user may be asked to perform some computation (at 514). In the case where the user is asked to perform computation, this request may take the form of asking the user to install the software that will perform the computation (e.g., computation component 206, shown in FIG. 2), or asking the user to enable software that has already been installed. In another example, the process of performing computation to gain access to aspect 108 may already have begun, but may take additional time to complete. In that case, the user could be notified that it will take some time before the user can gain access to aspect 108. For example, the process of earning access to aspect 108 through computation may involve solving a portion of a problem every day for several days. If such a multi-day process has not completed at the time that the user requests to use aspect 108, then the user may be advised that it will take some number of days before he or she may use aspect 108 of the service.

Figure 6:
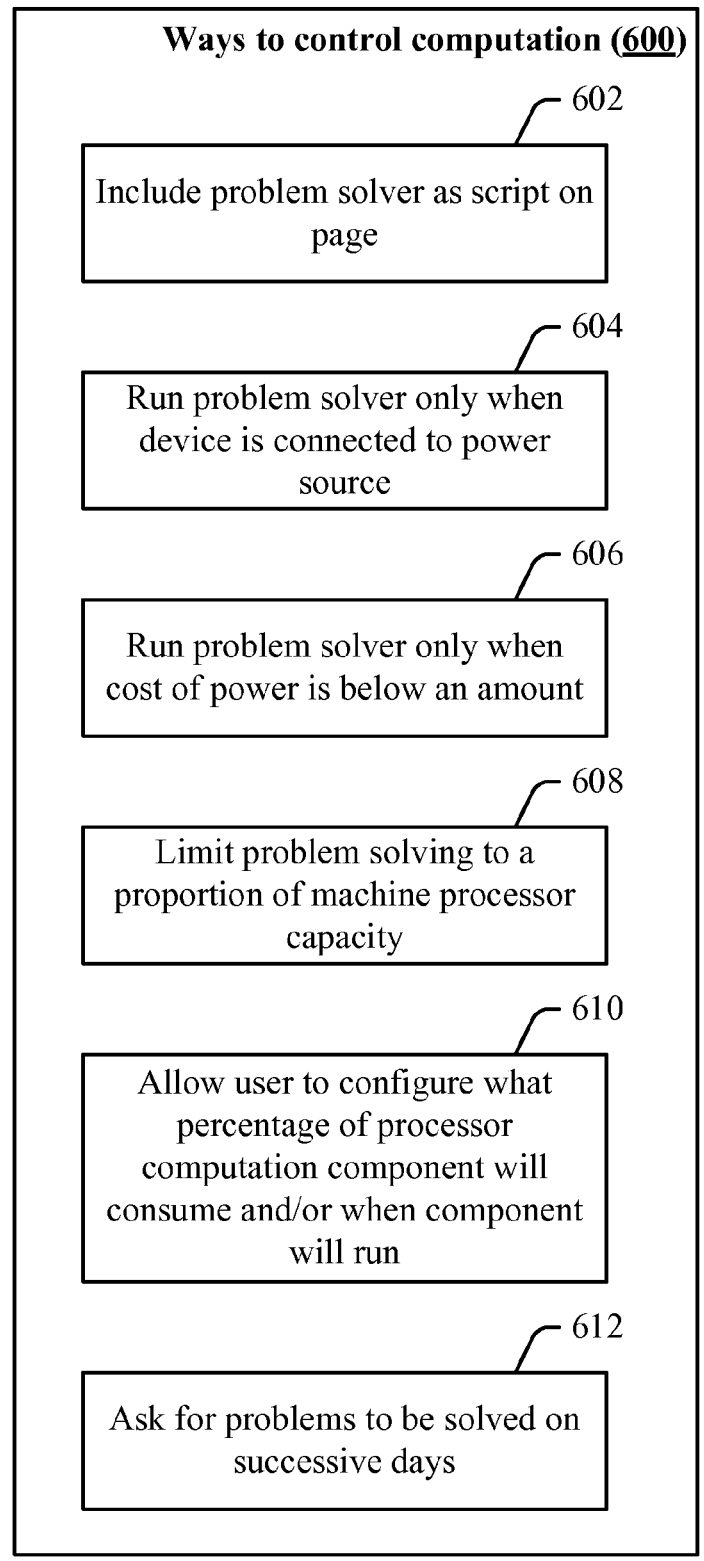
FIG. 6 is a block diagram of various ways in which a computational component could be deployed and/or used.

There are many variations regarding how a computational component may be deployed, and/or how such a component may be used to allow a user to earn access to some aspect of a service. FIG. 6 shows various ways (block 600) in which a computational component could be deployed and/or used. FIG. 6 shows merely an example set of variations; it is not an exhaustive list of variations on the subject matter that is covered herein.

One variation on the techniques described herein concerns how the computational component may be deployed. In this variation (block 602), the computational component is deployed as a script on the web page(s) through which a user interacts with a service. The script may be configured to run whenever the user is interacting with one of the service's web page. Thus, if the service is a web mail service, blogging service, or any other type of service, it would be expected that a legitimate user would load that service's pages into his or her browser, and would interact with the pages by entering information into forms, following links, etc. Ongoing user activity could be detected, and the script could be configured to make progress on the computation only when such activity is detected. As noted above, computation may be used to increase an abuser's cost of obtaining otherwise free web services. Professional, for-profit abusers generally do not have the time and/or resources to interact personally, for large amounts of time, with the web services they employ. Thus, such abusers would likely have to use bots or employees to interact with the web services in order to allow computation to proceed. Either bots or employees cost the abusers money, time, and effort. The prospect of having to spend this money may deter abusers from performing the computation that would give them enhanced access to the service.

Another variation, which is shown in block 604, is to allow computation to proceed only when the computer on which the computation is performed is connected to a non-battery power source. This variation is not directed so much at increasing the cost to an abuser, but rather on allowing the computation to be unobtrusive to legitimate users. Since computation may increase power consumption (or heat generated, which increases fan use, which increases power consumption), it may be less obtrusive for legitimate users to use the computation component if that component can avoid draining the user's battery when the user's laptop is not connected to wall power.

Another variation, shown in block 606, is to avoid performing computation except when the cost of power is below a defined amount. Again, this variation is a convenience to legitimate users. Some users may pay lower rates for power at night, and thus computation (which may increase power consumption) could be performed during these times of low-cost power. Also in furtherance of the goal of being unobtrusive to legitimate users, the percentage of the processor capacity that may be consumed by the computation application could be limited to some amount, such as 10% (at block 608). Or, to provide even greater flexibility to the user, the user could be allowed to set parameters that specify at what hours the computation component will run and/or what percentage of the processor capacity the computation component will consume (at block 610).

Yet another variation, which is shown at block 612, is to have the computation spread out over several days. For example, a user's machine could be given a different problem to solve every day for ten days. The user's machine would have to demonstrate that it had devoted resources to solving the problem each day (or, in greater generality, that it had devoted resources to solving the problem in stages that are separated by some amount of time, so that some amount of time passes between computations). In some cases, commercial computer time is charged by the day, and thus it is particularly expensive for an abuser to rent time on computers on successive days in order to perform computation. Thus, having the user solve a problem each day tends to increase an abuser's cost to gain access to a controlled aspect of a service.

An additional variation is that the amount and/or complexity of the problem to be solved could be adjusted based on factors such as IP address range, geography, or the type of device involved. For example, certain IP addresses (or ranges of addresses), or certain geographic areas of the world, may be historically associated with a high risk of misbehavior, so the amount and/or duration of computation that one might have to perform to earn the right to make more extensive use of a service might be increased for these addresses and/or ranges and/or geographic areas. Similarly, the amount and/or complexity of computation might be adjusted to account for the type of device involved—e.g., a mobile phone might be asked to perform less computation than a desktop computer, since the mobile phone is likely to have a slower processor and less battery capacity.

Figure 7:
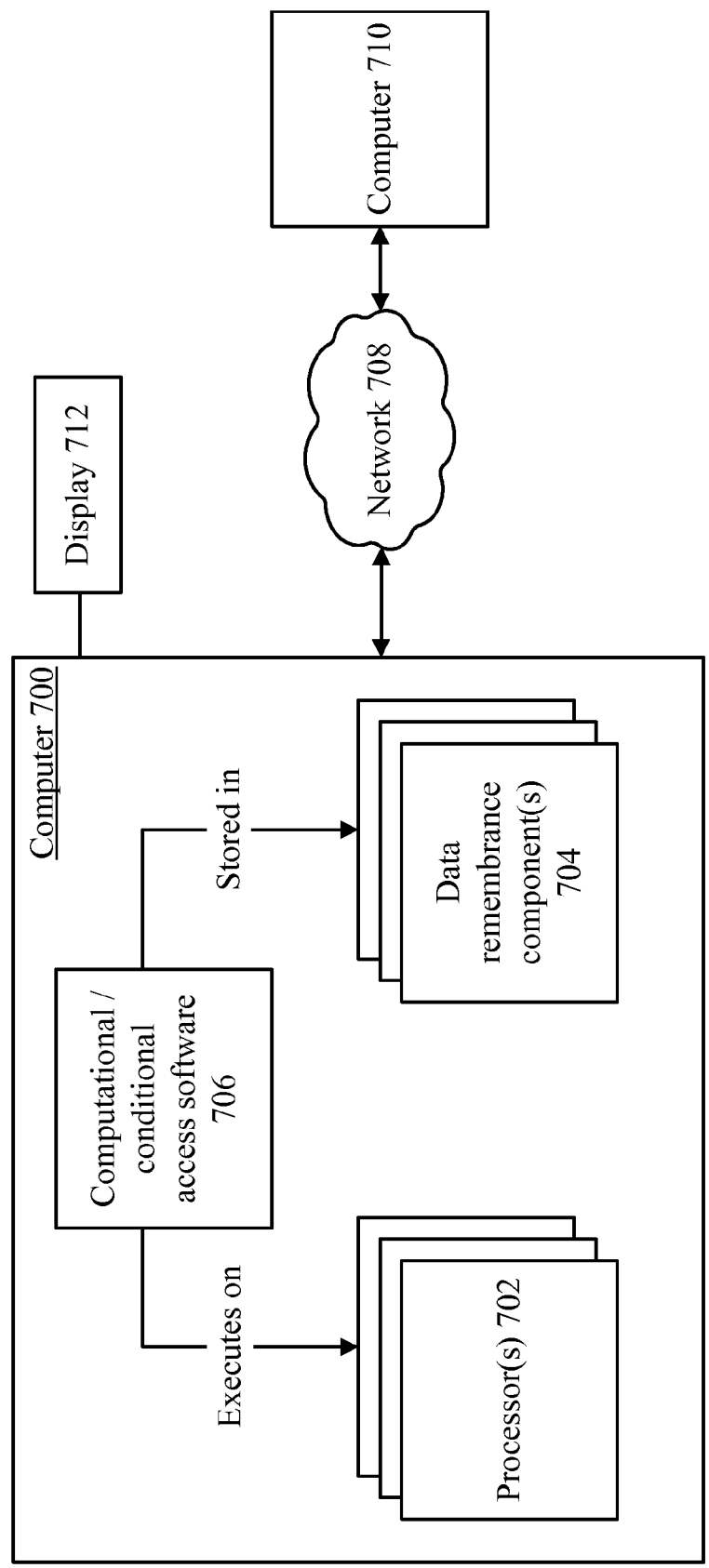
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is computational/conditional access software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of controlling access to a service, the method comprising:
   using a processor to perform acts comprising:
   receiving, from a user, a request to register to use the service;
   allowing said user to use a first aspect of the service without any pre-conditions as to said user performing any amount of computation;
   receiving, from said user, a request to use a second aspect of the service that is distinct from said first aspect of the service;
   determining that a user machine has performed an amount of computation for said user to obtain access to said second aspect of the service;
   allowing said user to use said second aspect of the service; and
   requesting that the user perform a first computation, and that said user perform a second computation after an amount of time has passed after said first computation is performed,
   wherein said determining that said user has performed an amount of computation comprises determining that said user has performed said first computation and said second computation separated by said amount of time.

2. The method of claim 1, wherein said acts further comprise:
   installing a computational component on a machine of said user;
   instructing said computational component to perform computation; and
   receiving, from said machine, proof that an amount of computation has been performed.

3. The method of claim 1, wherein the service is provided through web pages, wherein each of said web pages comprises a script that performs computation only when said user, or another user, interacts with one of said web pages, and wherein said determining that said user has performed an amount of computation comprises receiving, from said script, proof that said computation has been performed.

4. The method of claim 1, wherein the service comprises an e-mail service, wherein said first aspect comprises sending no more than a first number of e-mails per day, wherein said second aspect comprises sending more than said first number of e-mails per day.

5. The method of claim 1, wherein the service comprises a blogging service, a file-sharing service, or a photo-sharing service, wherein said first aspect comprises posting a first type of content, and wherein said second aspect comprises posting a second type of content that is distinct from said first type of content.

6. The method of claim 1, wherein the service comprises a social network, wherein said first aspect comprises using said social network, and wherein said second aspect comprises reading profiles of members of said social network.

7. The method of claim 1, said amount of time comprising a day.

8. One or more computer-readable storage devices that store executable instructions to obtain a right to access a first aspect of a service, wherein the executable instructions, when executed by a computer, cause the computer to perform acts comprising:
   receiving, from the service, which has said first aspect and which has a second aspect that is distinct from said first aspect, a first instruction to perform a first computation;
   performing said first computation in response to said first instruction;
   creating a first proof that said first computation has been performed by said computer;
   sending said first proof to a gate associated with the service;
   in response to having sent said first proof, obtaining for said user access to said first aspect of said service, access to said second service being obtained without any preconditions as to said user performing any amount of computation;
   receiving a second instruction to perform a second computation that is to be performed a defined amount of time after said first computation is performed;
   performing said second computation;
   creating a second proof that said second computation has been performed; and
   sending said second proof to said gate,
   wherein access to said second aspect of said service is conditioned on said second computation having been performed said defined amount of time after said first computation is performed.

9. The one or more computer-readable storage devices of claim 8, wherein said first computation is performed only when said computer is connected to a non-battery power source.

10. The one or more computer-readable storage devices of claim 8, wherein said first computation is performed only when a cost of power is below a defined amount.

11. The one or more computer-readable storage devices of claim 8, wherein said acts further comprise:
    limiting performance of said first computation to less than a defined proportion of a capacity of a processor of the computer.

12. The one or more computer-readable storage devices of claim 8, wherein said acts further comprise:
    receiving, from a user, parameters specifying a limit on a percentage of processor capacity that is to be used to perform said first computation, or parameters specifying a time of day at which said first computation is to be performed.

13. The one or more computer-readable storage devices of claim 12, said percentage comprising ten percent.

14. The one or more computer-readable storage devices of claim 8, wherein the service is provided through one or more web pages, wherein said executable instructions are embedded in said web pages as scripts, and wherein said instructions perform said first computation only when a user interacts with one of said web pages.

15. The one or more computer-readable storage devices of claim 8, said defined amount of time comprising a day.

16. A system for controlling access to a service, the system comprising:
    a processor;
    a data remembrance component;
    a service provider configured to provide a first aspect of the service and a second aspect of the service that is distinct from said first aspect of the service, wherein said service provider is configured to receive, from a user, a request to register for the service and a request to use said first aspect of the service, wherein said service provider is configured to allow access to said first aspect of the service without regard to whether a first computation has been performed by a user machine; and
    a gate component that is stored in said data remembrance component and that executes on said processor, wherein said gate component is configured to receive, from said user, a request to use said second aspect of the service, wherein said gate component is configured to determine whether to allow or deny access said user to said second aspect of said service depending on whether said machine operated by said user has performed said first computation and whether said machine operated by said user has also performed a second computation after an amount of time has passed after said first computation has been performed, said user being requested to perform said second computation after said amount of time has passed since said first computation has been performed.

17. The system of claim 16, wherein the service comprises an e-mail service, wherein said first aspect comprises sending no more than a first number of e-mails per day, wherein said second aspect comprises sending more than said first number of e-mails per day.

18. The system of claim 16, wherein said service provider is configured to install a computational component on a machine of said user which performs said computation.

19. The system of claim 16, wherein said service provider is configured to provide one or more web pages through which said user interacts with said service, wherein each of said web pages comprises a script that performs said computation, wherein said script is configured to perform said computation only when said user interacts with one of said web pages.

20. The system of claim 16, said amount of time comprising a day.

* * * * *